June 2, 1964 — E. KWONG ET AL — 3,135,116
TURBINE FLOW MEASURING DEVICE
Filed Nov. 20, 1957 — 2 Sheets-Sheet 1
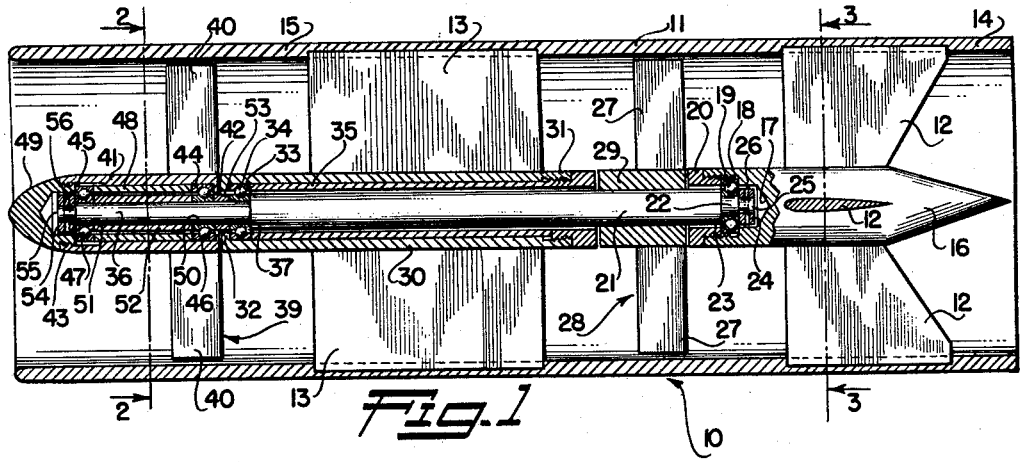
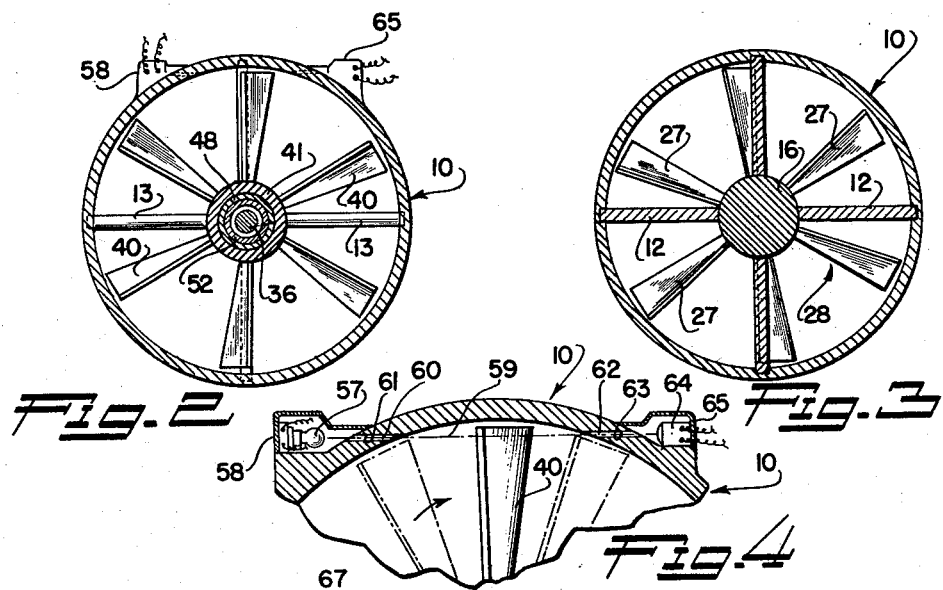
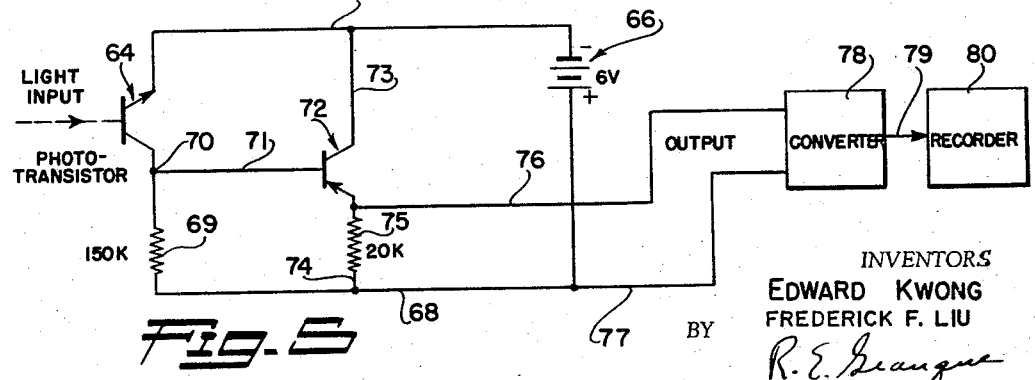
INVENTORS
EDWARD KWONG
FREDERICK F. LIU
BY
R. E. Geangue
Attorney

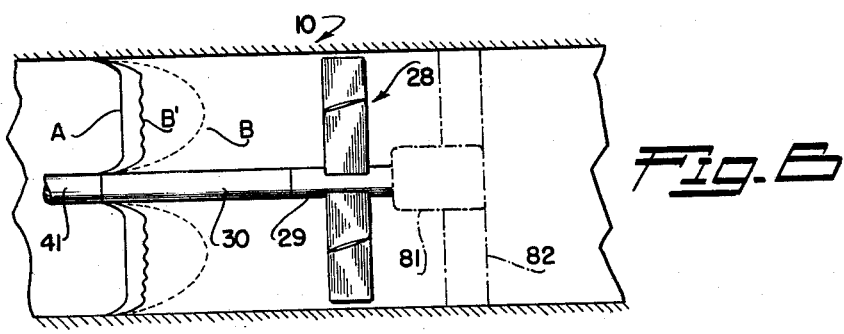
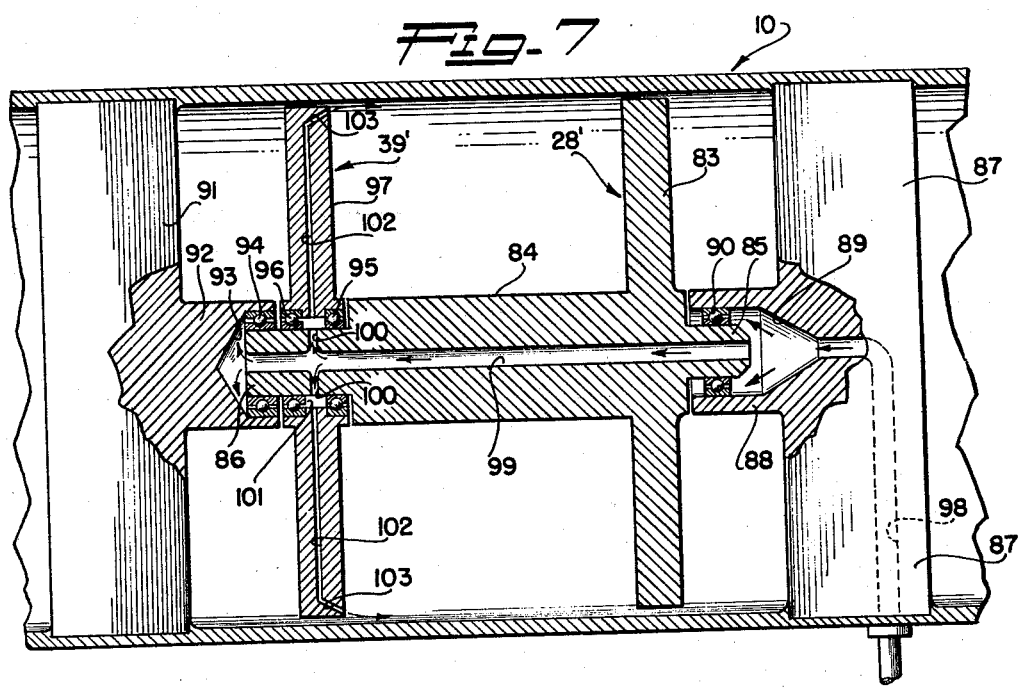

United States Patent Office 3,135,116
Patented June 2, 1964

3,135,116
TURBINE FLOW MEASURING DEVICE
Edward Kwong, Woodland Hills, and Frederick F. Liu, Northridge, Calif., assignors to Quantomics, Inc., Tarzana, Calif., a corporation of California
Filed Nov. 20, 1957, Ser. No. 697,618
13 Claims. (Cl. 73—231)

This invention relates to a rotating device having one rotor element mounted on another rotor element and more particularly to such a device utilized to sense fluid flow.

At present, flow meters of the turbine type comprise turbine blades mounted on a single rotor within a flow passage or conduit and the speed of rotation of the blades is sensed to measure the volume of fluid flow through the passages. Mainly because of the frictional drag inherent in the rotor mounting, the speed at which the rotor is driven by the fluid in the passage is not directly proportional to volume flow at very high and very low flow rates, and the measure of volume is in error. In the present invention, such error is minimized by utilizing two turbines, one being the main turbine directly supported for rotation by the flow passage and the other being the indicating turbine supported on the rotatable shaft of the main turbine. The speed of the indicating turbine is measured to obtain volume flow through the passage and since only slight relative movement exists between the two turbines, friction drag on the indicating turbine is at a minimum and thus the error in flow measurement because of rotational friction is at a minimum. In the present invention, flow disturbances between the blades of both turbines are minimized by twisting the blades in accordance with a tangent function of the radial distance from the shaft.

Also, a novel speed measuring device is provided to sense the speed of either turbine. This device utilizes a beam of energy, such as light, which is passed through the flow passage and is interrupted successively by each blade of the turbine or by other elements specially attached to the turbine. The interruption of the beam results in pulses which are sensed by a pick-up in order to measure the speed of rotation. In prior devices, magnetic pick-up devices have been mounted on the flow passage to sense the movement of the blades and these magnetic devices tend to produce drag on the turbine blades. By utilizing an energy beam which is physically interrupted by the blades, the speed of the turbine is not affected by the measuring device.

Another advantage of the present invention results from the feed-back effect on the velocity profile of the fluid at the indicating turbine which is provided when the main turbine is located downstream of the indicating turbine. To avoid measurement errors, it is desirable to maintain a velocity distribution pattern across the indicating turbine which is as constant as possible so that all portions of the turbine blades are subject to the same flow velocity. It is well known that at low flow velocities, an approximation to a constant velocity profile exists but at high flow velocities where Reynolds number becomes important, the velocity profile is not constant and higher velocities exist at the center than at the surfaces of the passage. Thus, the single turbines of prior devices are subject to this change in velocity profile upon change in flow velocity. In the present invention, the impedance to flow at the main turbine is fed back upstream to the indicating turbine so that the velocity profile at the indicating turbine is more constant at all flow velocities. If the indicating turbine is located downstream of the main turbine, the impedance to flow at the main turbine also serves to straighten out the velocity profile at the downstream location of the indicating turbine.

When the device of the invention is utilized to measure the volume flow rate of very hot fluids, such as air, it is possible to effectively cool the bearings of both the main and indicating turbines. A cooling fluid is passed through the support struts to the bearings for the main turbine, which generates the most heat, and is then passed through the main turbine shaft to the bearings for the indicating turbine and is discharged into the fluid at the end of the blades. Thus, the flow of cooling fluid has no appreciable effect on the velocity of the indicating turbine blades. Of course, fuel can be used as the cooling fluid in the event the fluid in the passage is to be utilized for combustion downstream of the main turbine. While the invention has been discussed in connection with its use in a turbine flow meter, it can be incorporated in any device.

It is therefore an object of the present invention to provide a rotating device having one rotatable element mounted upon another rotatable element to reduce frictional drag on the one element.

Another object of the invention is to provide a turbine flow meter having an indicating turbine rotatably mounted on the shaft of another turbine and having means for measuring the speed of rotation of the indicating turbine.

Another object of the invention is to provide a device for measuring the speed of a rotating member in a fluid passage, said device utilizing a beam of energy through the passage which is successively interrupted by the rotating member.

A further object of the invention is to provide a rotating device having one rotatable element upon another rotatable element and having means for cooling the bearings for both elements.

These, and other objects of the invention not specifically set forth above become apparent from the accompanying description and drawings in which:

FIGURE 1 is a vertical section, partly in elevation, of a flow meter incorporating the present invention;

FIGURE 2 is a transverse vertical section along line 2—2 of FIGURE 1 showing the indicating turbine;

FIGURE 3 is a transverse vertical section along line 3—3 of FIGURE 1 showing the main or downstream turbine;

FIGURE 4 is an enlarged partial section along line 4—4 of FIGURE 1, illustrating the device for measuring the speed of the indicating turbine;

FIGURE 5 is a schematic illustration of an electrical circuit for the speed measuring device;

FIGURE 6 is an illustration of the velocity profile existing upstream of the main turbine for both low and high flow velocities; and FIGURE 7 is a vertical section of a modification of the present invention illustrating the passages for cooling the bearings of the main and indicating turbines, and for minimizing the damage due to any high surge of gas which rotates the indicating turbine beyond its rated range.

The embodiment of the invention shown in FIGURE 1 comprises a flow meter having a conduit 10 which is connected in any suitable manner to a flow passage containing the fluid whose flow volume is to be measured. The conduit has a central section 11 having four internal slots at each end to snugly receive the ends of supports 12 and 13. After the ends are placed in the slots, sections 14 and 15 are secured, by welding or otherwise, to opposite ends of section 11 to complete the conduit 10 and hold the various components in place. The four supports 12 are connected to a center body 16 located at the downstream end of the conduit and the body 16 has an end opening 17 which receives the outer bearing race 18 for ball bearings 19. Retaining member 20 is threaded into opening 17 to secure the outer race 18. The end of shaft 21 is also located in opening 17 and has a reduced portion 22 for supporting inner race 23 for bearings 19. A collar 24 is secured to reduced end portion 25 of shaft 21 by pin 26 in order to retain the inner race 23. By this structure, one end of shaft 21 is rotatably supported centrally of conduit 10 by bearings 19 and by supports 12.

Six radial blades 27 of main turbine 28 are uniformly spaced around hub 29 and secured thereto and the hub is secured to shaft 21 at a location adjacent retaining member 20. The four supports 13 are connected with a center cylinder 30 surrounding shaft 21 and internally having a threaded end 31 and a reduced end 32. Outer race 33 for ball bearings 34 is located at reduced end 32 and is secured in place by a sleeve 35, located within cylinder 30 and threaded to end 31 of the cylinder. The shaft 21 has a reduced portion 36 which supports inner race 37 for ball bearings 34 so that the shaft 21 is also supported by bearings 34 and by supports 13.

The reduced portion 36 of shaft 21 supports the indicating turbine 39 having six radial blades 40 uniformly spaced around and secured to a cylindrical hub 41. This hub internally has a reduced end 42 and a threaded end 43 and contains the outer races 44 and 45 for ball bearings 46 and 47, respectively. The race 44 is located at reduced end 42 and sleeve 48 is located within hub 41 as a spacer between races 44 and 45. These races and the sleeve are held in position by a streamlined nose plug 49 threaded to end 43 of hub 41. The inner races 50 and 51 for bearing 46 and 47, respectively are carried by reduced shaft portion 36 and are separated by a spacer sleeve 52. Also, inner race 50 is spaced from inner race 37 by ring 53. The inner races 37, 50 and 51 and the sleeve 52 are held in place by a collar 54 secured to reduced end 55 of shaft 21 by pin 56. It is therefore apparent that indicating turbine 39 is wholly supported on reduced portion 36 of shaft 21 by bearings 46 and 47.

During fluid flow through conduit 10, both the main turbine 28 and the indicating turbine 39 will be rotated. Since shaft 21 of main turbine 28 is supported by stationary supports 12 and 13, the bearings 19 and 34 will be subject to frictional drag. However, since indicating turbine 39 is mounted on rotating shaft 21 by bearings 46 and 47, minimum friction drag will be present at the mounting for turbine 39. Both turbines are constructed exactly the same and the same volume flows through both turbines. Therefore, both turbines would rotate at the same speed if no frictional losses were present. However, because of the difference in frictional drag, indicating turbine 39 will rotate slightly faster than main turbine 28 but the relative movement between the turbines is small so that minimum drag is present on the indication turbine. Also, because of the small relative movement, the loading on the bearings for the indicating turbine, resulting from the force of the fluid on the blades, is only a small fraction of the loading produced on the bearings for the main turbine. It is therefore apparent that the speed of the indicating turbine is an excellent indication of volume flow through the conduit 10.

The presence of the main turbine 28 downstream of the indicating turbine also provides an impedance to flow in conduit 10 which is fed back upstream to even out the velocity profile of flow at the indicating turbine. As previously stated, it is desirable to maintain a constant velocity across the indicating turbine blades so that each portion of the blades receives the same fluid force and the blades operate at maximum efficiency. Referring to FIGURE 6, line A illustrates a velocity profile, present at the indicating turbine during low velocity flow and it is noted that the velocity across the blades is substantially constant. At low velocities, the feed back from the main turbine has very little effect on the velocity profile but no feed back is required because of the acceptable velocity profile. In the absence of the turbine 28, the velocity profile indicated by dotted line B would be present across the indicating turbine at high velocity flow through conduit 10 and such profile would not provide a turbine speed accurately representing volume flow. However, the turbine 28 provides maximum impedance to the high velocity flow areas of the profile and this impedance results in the velocity profile at the indicating turbine represented by line B'. Thus, even at high velocity flows, the velocity distribution over the area of the blades of the indicating turbine 39 is substantially constant and results in a turbine speed representative of volume flow through conduit 10. The presence of the turbine 28 therefore provides a rotating shaft for supporting the indicating turbine and an impedance feed-back to modify the velocity profile at the indicating turbine, both resulting in increased accuracy of the indicating turbine. To further increase the accuracy of the indicating turbine, the blades 27 and 40 of both turbines are twisted along their length at a progressively increasing angle which is a tangent function of the radial distance from the center line of conduit 10. As illustrated in FIGURES 2–4, the blades have a small twist at their hubs and a larger twist at their outer ends. The twist in the blades serves to minimize the flow disturbance in the space between adjacent blades of the turbines. The supports 12 and 13 serve as flow straighteners and the axial distance between turbines will be selected to have minimum relative rotation between the turbines and the best velocity profile at the indicating turbine. It is understood that the direction of flow through conduit 10 can be reversed so that the main turbine 28 is located upstream from indicating turbine 38 while still supporting the indicating turbine on the shaft of the main turbine to obtain accurate flow measurements. In such case, the impedance of the main turbine serves to straighten out the velocity profile at the downstream indicating turbine. The impedance effect is not fed back upstream to the indicating turbine but serves to straighten out the velocity pattern of the flow behind the main turbine, which straightened pattern is presented to the downstream indicating turbine.

In order to sense the speed of the indicating turbine, a light source 57 is located in a housing 58 secured to conduit 10 (see FIGS. 2 and 4) and transmits a light beam 59 through a transparent rod 60 located in opening 61 in the conduit. The light beam passes through the liquid in the conduit and through transparent rod 62 located in opening 63 in the conduit. A photo-transistor 64 is located in housing 65 secured to the conduit and is positioned to receive light beam 59. The light beam is located at the outer circumference of the conduit so that it is interrupted by the tip of each turbine blade 40 during rotation of turbine 39. FIGURE 4 illustrates the successive positions of a single blade 40 as it moves into and out of the path of beam 59. Thus, the photo-transistor receives intermittent light pulses at a frequency proportional to the rotation speed of the indicating turbine.

Referring to FIGURE 5, the photo-transistor 64 is connected across a 6 volt source 66 through lines 67 and 68 and line 68 contains a resistor 69. Each time the photo-transistor 64 is lighted by beam 59, its resistance decreases so that the voltage drop across resistor 69 increases and the potential at point 70 goes more negative. The varying potential at point 70 is connected through line 71 to transistor 72 which is connected between power lines 67 and 68 by line 73 and by line 74 containing resistor 75. The transistor 72 serves as a current amplifier controlled by the variable voltage at point 70 and the variable current voltage, all such devices being well known and common drop across resistor 75 of the same frequency as the light pulses received by photo-transistor 64. This variable voltage drop is connected by lines 76 and 77 to converter 78 of well known construction which develops a voltage level proportional to the frequency of voltage variation across resistor 75. The converter 78 may be a digital counter or any one of numerous electronic devices for converting the count rate into a proportional direct-current voltage, all such devices being well known and commercially available. The voltage level output of the converter is transmitted through line 79 to a recorder 80 which records the voltage level in terms of volume flow through conduit 10. It is apparent that a light sensitive photo cell could be utilized in place of photo-transistor 64 and that various other circuits could be utilized to convert the light pulses, resulting from interruption of light beam 59 into a record of flow velocity. Also, if the fluid within conduit 10 cannot be penetrated by a light beam, the light source 57 can be replaced with a radioactive chamber or source of gamma rays and the light sensitive source could be replaced, respectively, with an ionization chamber or a Geiger-Muller counter. A common type of magnetic pick-up could be mounted on conduit 10 to sense the passage of each blade in order to measure the speed of the indicating turbine but this type of pick-up places unnecessary drag on the turbine not present when an interrupted beam of light provides the speed indication.

Referring to FIGURE 6, the hub 29 for main turbine 28 can be connected to a power source 81, such as an electrical motor, supported by struts 82. In this case, the main turbine is driven as a pump and the indicating turbine can be used to obtain a measure of the volume of fluid pumped through conduit 10. Also, the signal of volume flow produced by the measuring system described above could be utilized to control the speed of the motor 81 and the flow volume.

From the standpoint of construction materials, it is apparent that the indicating turbine 39 and its support can be very light since there is very little rotation relative to shaft 21 and very little heat is generated due to friction. Also, the bearing for the main shaft 21 can be easily cooled since the bearing mountings are rigid with the conduit. However, when very hot fluids are flowing through conduit 10, cooling of the bearing for both the main turbine and the indicating turbine can be easily accomplished. Referring to FIGURE 7, the blades 83 of main turbine 28' are secured to shaft 84 having reduced ends 85 and 86. Support 87 has a projection 88 with an opening 89 containing ball bearings 90 to support end 85 of the shaft 84. Also, support 91 has a projection 92 with an opening 93 containing ball bearings 94 to support end 86 of the shaft. Ball bearings 95 and 96 on end 86 serve to rotatively support blades 97 of the indicating turbine 39'. In order to cool the bearings for both turbines, the support 87 contains a cooling fluid passage 98 which connects with opening 89 in order to direct the cooling fluid to bearings 90. The cooling fluid is supplied to passage 98 at the desired pressure by a suitable external supply system. A central passage 99 in shaft 84 also supplies the cooling fluid to opening 93 to cool bearings 94. The shaft 84 contains a plurality of radial passages 100 for directing cooling fluid from passage 99 to the annular space 101 between bearings 95 and 96 to cool these bearings. Each of the blades 97 contains a radial cooling passage 102 which connects with space 101, and the outer end 103 of each passage 102 is directed at an angle to discharge the cooling fluid into conduit 10. The pressure of the cooling fluid and the centrifugal force acting on the fluid will force the cooling fluid to be injected and distributed within conduit 10 through ends 103. A number of end passages 103 can be distributed in any selected manner along the blades to achieve a desired distribution pattern for injection of the cooling fluid and the character of the passages can be varied so long as the direction remains substantially parallel with the axis of conduit 10. Since the injection passages are directed in a substantially axial direction and the passages 102 are in a radial direction, there is minimum effect on the speed of the indicating turbine. Any suitable pick-up, such as the one illustrated in FIGURES 4 and 5, can be utilized to sense the speed of indicating turbine 39'.

The conduit 10 of FIGURE 7 can form a portion of the passage of an air breathing engine, such as a ram jet, and the indicating turbine 39' will provide a very accurate measure of the air flow through the engine. In such case, engine fuel could be introduced to passage 98 as the cooling fluid and the fuel will be discharged from passage end 103 into the air stream. The discharged fuel mixed with the air will then be combusted at the combustion chamber (not shown) downstream of the turbine 28'. Because of the cooling passages, the turbines 28' and 39' can withstand elevated air temperatures within conduit 10 and the measure of air flow provided by turbine 39' can be utilized in various engine control systems.

The present invention provides a turning device usable generally for speed measurement and also provides a minimum friction turning device for all uses. While turbines have been illustrated, it is understood that other components, such as discs with venturi holes, can be utilized. It is understood that the speed of both rotating components or turbines can be measured and that any large difference in their speed will indicate fouling of one of the turbines. The principle of the invention is applicable to relative linear movement of two movable members as well as rotational movement and it is not necessary that the two members be subjected to the same moving forces. While the turbines illustrated are of the same construction, one can be different than the other. However, the more nearly the turbines are the same, the less movement exists between the turbines. Various other modifications are contemplated by those skilled in the art without departing from the spirit and scope of the invention as hereinafter defined by the appended claims.

What is claimed is:

1. A flow meter comprising a fluid conduit, a first turbine located within said conduit and having a plurality of blades, shaft means mounted integrally with said first turbine and driven thereby, support means located within said conduit and secured thereto, first bearing means supported by said support means for rotatably mounting said shaft means, a second turbine located within said conduit upstream of said first turbine, second bearing means supported by said shaft means for rotatably mounting said second turbine in independently rotatable relationship with respect to said shaft means, said turbines being substantially identical in construction for rotating at substantially the same rate of speed in response to the same fluid flow, means disposed between said turbines for straightening the fluid flow from said second turbine to said first turbine, and means for sensing the rotational velocity of said second turbine resulting from fluid flow through said second turbine.

2. A flow meter as defined in claim 1 wherein said support means contains cooling chamber means adjacent said first bearing means, means for connecting a cooling fluid with said chamber means, axial passage means in said shaft means communicating with said cooling chamber means and radial passage means in said shaft means and communicating with said axial passgae means for directing said cooling fluid to said second bearing means.

3. A flow meter as defined in claim 2 wherein said turbine blades contain radial passage means in communication with the radial passage means in said shaft means, and substantially axial passage means in said blades connecting with the radial passage means in said blades for injecting the cooling fluid into said conduit.

4. In a flow meter, in combination, a fluid driven rotation device comprising a first member disposed in the path of travel of said fluid and having means rotatable in response thereto for rotating said first member in a pre-determined direction, said rotatable means being fixed against axial movement, a second member disposed in said path of travel of said fluid and rotatable in response thereto substantially free of restraint from rotation relative to said first member in said pre-determined direction, said second member also being fixed against axial movement, said second member being axially displaced from said fluid responsive means and rotatably supported on said first member so that the rotation of said first member will impart a reduction in the rotational friction of said second member, and means for sensing the rotation of said second member.

5. In a flow meter, in combination, a fluid responsive rotation device comprising a fluid conduit, a first member disposed within said conduit and having means responsive to the fluid flow through said conduit for effecting rotation of said first member in a predetermined direction about a pre-determined axis, said responsive means being fixed against axial movement, a second member axially displaced from said fluid responsive means and rotatably mounted on said first member and rotatable in said pre-determined direction substantially free of restraint from rotation relative to said first member in response to the fluid flow through said conduit, said second member also being fixed against axial movement, the frictional drag on said second member being less than the frictional drag on said first member, and means for sensing the rotation of said second member.

6. In a flow meter, in combination, a fluid conduit, a first rotatable member located within said conduit, means secured to said conduit for rotatably mounting said first member and for holding said first member against axial movement, a second rotatable member located within said conduit and spaced from said first rotatable member, means for rotatably mounting said second rotatable member on said first rotatable member and for holding said second member against axial movement, said first rotatable member and said second rotatable member each being individually rotatably responsive to the fluid flow passing through said conduit, said rotatable members being substantially free of relative rotation restraining connection therebetween, and and each of said rotatable members being caused to rotate in the same direction, the rotation of the first member effecting a reduction in the friction of rotation of the second member so that the frictional drag on the second member is less than the frictional drag on the first member, and means for sensing the rotation of said second member.

7. In a flow meter, in combination, a fluid conduit, a first turbine located within said conduit, shaft means rotatably supported by said conduit, said first turbine being rotatably mounted integrally with and driving said shaft means, a second turbine located within said conduit and spaced from said first turbine, means for rotatably mounting said second turbine on said shaft means, said first turbine and said second turbine being individually rotatably responsive to the fluid flow passing through said conduit and being substantially free of mechanical restraint against relative rotation for rotation in the same direction, and means for sensing the rotational velocity of said second turbine to obtain a measure of fluid flow through said conduit.

8. A flow meter as defined in claim 7 wherein the distance between said turbines in said conduit is small enough to cause the impedance to flow at said first turbine to straighten the velocity profile at said second turbine.

9. A flow meter comprising a fluid conduit, a first turbine located within said conduit, shaft means rotatably supported by said conduit, said first turbine being mounted integral with and driving said shaft means, a second turbine located within said conduit and spaced from said first turbine, means for rotatably mounting said second turbine on said shaft means, said first and second turbines being of substantially the same construction, flow straightening means disposed between said turbines whereby said turbines receive substantially the same rotational force from the fluid flowing through said conduit and rotate at substantially the same rate of speed, and means for sensing the rotational velocity of said second turbine to obtain a measure of fluid flow through said conduit.

10. A flow meter as defined in claim 9 wherein said second turbine comprises a plurality of blades, said sensing means comprising means for passing a beam of energy through said conduit at a location in which the beam is reflected successively by each blade of said second turbine during rotation thereof and means responsive to said interrupted beam for sensing the speed of rotation of said second turbine.

11. A method of measuring fluid flow through a conduit comprising the steps of rotating a first member in the conduit at a speed responsive to and proportional with the rate of fluid flow, rotating a substantially rotationally unrestrained second member on said first member in said conduit at a speed responsive to and proportional with the rate of fluid flow, the second member rotating in the same direction as the first member independently thereof, and then measuring the rotational speed of said second member.

12. In combination, a rotatably mounted shaft, a first member integrally mounted on said shaft for driving said shaft, a second member of substantially the same construction as the first member rotatably mounted on said shaft and axially displaced from said first member, said first member and said second member being independently rotatably responsive to fluid flow past both members, means for directing the same volume of fluid flow and in substantially the same direction past both members, and means for sensing the rotational velocity of said second member.

13. In combination, a fluid conduit, a first rotatable member located within said conduit, means secured to said conduit for rotatably mounting said first member and for holding said first member against axial movement, a second rotatable member located within said conduit and spaced from said first rotatable member, and means for rotatably mounting said second rotatable member on said first rotatable member and for holding said second member against axial movement, said first rotatable member and said second rotatable member each being individually rotatably responsive to the fluid flow passing through said conduit and each of said rotatable members being caused to rotate in the same direction, the rotation of the first member effecting a reduction in the friction of rotation of the second member so that the frictional drag on the second member is less than the frictional drag on the first member, means for sensing the rotational velocity of said second member to obtain a measure of fluid flow through said conduit, said first and second members being of substantially the same construction to receive substantially the same rotational force from the fluid, and flow straightening means disposed between said members.

References Cited in the file of this patent
UNITED STATES PATENTS

| | | |
|---|---|---|
| 677,957 | Davis | July 9, 1901 |
| 1,467,565 | Blair | Sept. 11, 1923 |
| 2,406,723 | Von Hortenau | Aug. 27, 1946 |
| 2,602,330 | Kollsman | July 8, 1952 |
| 2,623,389 | Van Oosterom | Dec. 20, 1952 |
| 2,659,198 | Cook | Nov. 17, 1953 |
| 2,714,310 | Jennings | Aug. 2, 1955 |
| 2,723,562 | Lutz et al. | Nov. 15, 1955 |
| 2,800,022 | Granberg | July 23, 1957 |
| 2,814,949 | Bodge | Dec. 3, 1957 |
| 2,832,218 | White | Apr. 29, 1958 |
| 2,848,893 | Tuffet et al. | Aug. 26, 1958 |
| 2,857,761 | Bodge | Oct. 28, 1958 |
| 2,877,649 | Power | Mar. 17, 1959 |
| 2,914,944 | Ballard | Dec. 1, 1959 |
| 2,941,402 | Scanes | June 21, 1960 |